(12) United States Patent
Camacho Muñoz

(10) Patent No.: US 8,596,059 B2
(45) Date of Patent: Dec. 3, 2013

(54) METHOD FOR ROTATION OF A SHAFT USING THE FORCE OF GRAVITY

(76) Inventor: Juan Ernesto Camacho Muñoz, Caracas (VE)

(*) Notice: Subject to any disclaimer, the term of this patent is extended or adjusted under 35 U.S.C. 154(b) by 0 days.

(21) Appl. No.: 13/338,832

(22) Filed: Dec. 28, 2011

(65) Prior Publication Data

US 2013/0167529 A1 Jul. 4, 2013

(51) Int. Cl.
*F03B 17/02* (2006.01)

(52) U.S. Cl.
USPC .......................................... 60/496

(58) Field of Classification Search
USPC .......................................... 60/495–497, 639
See application file for complete search history.

(56) References Cited

U.S. PATENT DOCUMENTS

| | | | |
|---|---|---|---|
| 6,803,670 B2 * | 10/2004 | Peloquin | 290/53 |
| 7,944,066 B2 * | 5/2011 | Cole | 290/42 |
| 2006/0017292 A1 * | 1/2006 | Matsubara | 290/43 |
| 2008/0092535 A1 * | 4/2008 | Razack | 60/496 |
| 2010/0059320 A1 * | 3/2010 | Michel et al. | 188/1.11 E |

* cited by examiner

*Primary Examiner* — Kenneth Bomberg
*Assistant Examiner* — Jonathan Matthias
(74) *Attorney, Agent, or Firm* — Glenn M. Massina, Esq.; Fox Rothschild LLP

(57) ABSTRACT

A method for generating rotational movement including supporting an output shaft for rotational movement wherein the output shaft includes at least two one-way clutch mechanisms attached thereat; positioning an infton assembly, having a weighted member and an inflatable bladder, in association with each one-way clutch mechanism such that each infton assembly is surrounded by a buoyancy fluid; and controlling inlet and outlet valves of the infton assembly such that each inlet valve is opened to facilitate flow of a filling fluid having a density less than that of the buoyancy fluid into the respective inflatable bladder as the respective weighted member reaches a lower limit of travel and each outlet valve is opened to facilitate exhausting of the filling fluid within the respective inflatable bladder as the respective weighted member reaches an upper limit of travel.

17 Claims, 23 Drawing Sheets

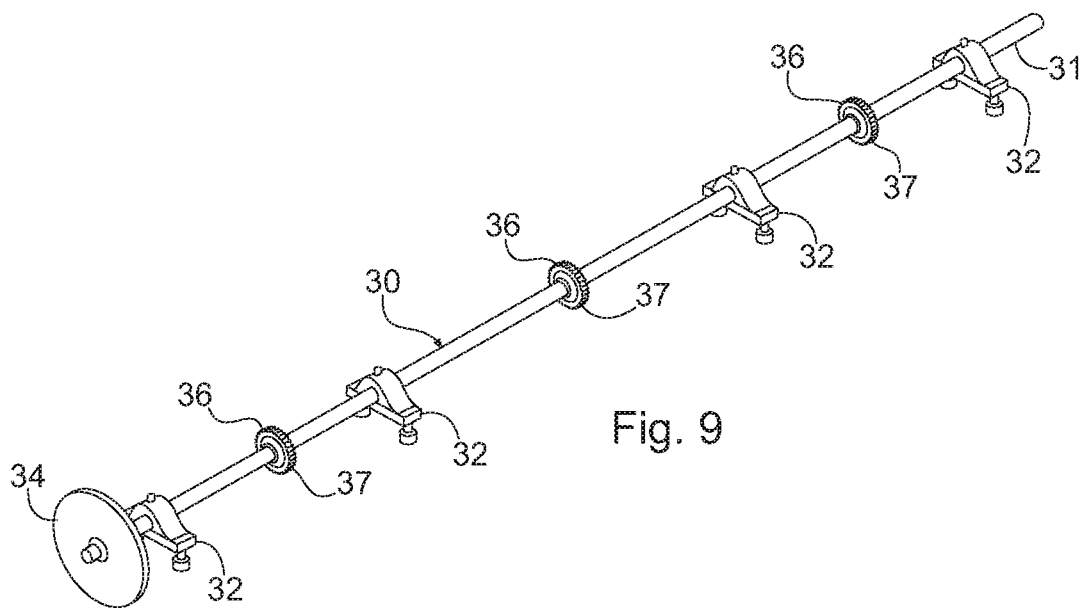

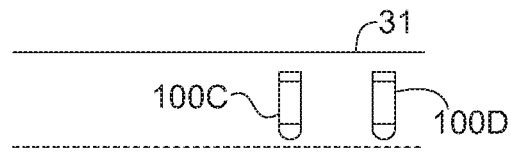
Fig. 12A
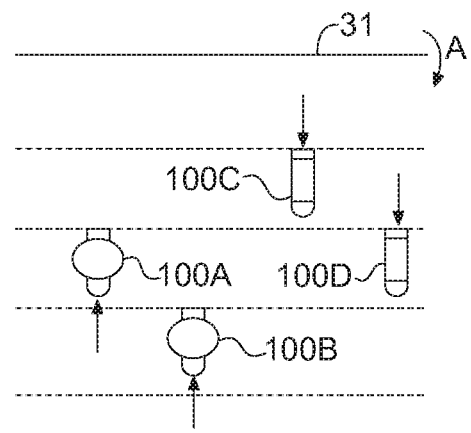
Fig. 12C
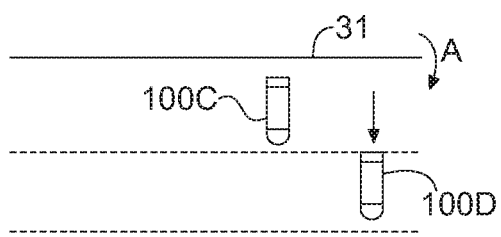
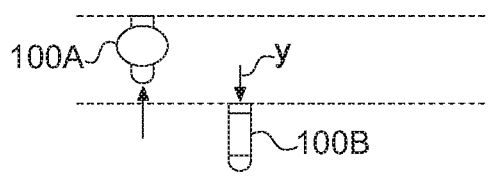
Fig. 12B

METHOD FOR ROTATION OF A SHAFT USING THE FORCE OF GRAVITY

FIELD OF THE INVENTION

The present invention relates generally to shaft rotation and in particular discloses a method for rotating a shaft using the force of gravity.

BACKGROUND OF THE INVENTION

A rotating shaft is required for many activities inside and outside of industry. For example, rotating shafts may be used for transportation in ships, driving pumps, drilling and energy generation. The rotating shaft provides rotational movement as an input, either directly or through a gear box or the like, to the output device, for example, the ship propeller, the pump or drill input shaft, or in the case of energy generation, to a generator, for example, a three phase generator, which in turn utilizes the rotational movement to generate electricity.

In each of these and in other applications, an input force is required to rotate the shaft. The input force may be provided using a direct fuel source, e.g. gasoline engine, or electrical energy, e.g. electric motor. In the case of energy generation, there are various methods to generate electric energy, for example, renewable energy sources including biofuel, biomas, geothermal, hydro power; solar power; tidal power; wave power; and wind power and non-renewable energy sources including thermal power plants (burning different fuels like: charcoal, coal, diesel, gasoline, etc.) and nuclear power plants.

Only a few countries in the world have rivers large enough to construct hydropower plants and some that do are not ready to construct hydropower plants. Similarly, only a few countries have the technology to install nuclear power plants. The availability of coal, petroleum and other fuels varies geographically. The needs are different in different countries, and the solutions vary from country to country.

In addition, the price of oil is growing very rapidly (today price USD 120/barrel). In less than twenty years, the price grew more than 900%. In addition, if the consumption of the oil in the world continues at current rates, the supply will be depleted relatively quickly, with some speculation that supply would be exhausted before the end of the twenty-first century.

In addition to the above concerns, current energy sources have varying degrees of negative environmental impacts (e.g. the April 1986 disaster at the Chernobyl nuclear power plant, disaster in Fukushima—Japan March 2011, Gulf oil spill—April 2010) and have been restricted regarding the various dangers. In view of the dangers and environmental impact, many energy generation facilities are located in remote locations, thereby requiring increased expense to transport the energy and energy loss during such transportation.

It is desirable to provide a system for rotating a shaft which minimizes danger, environmental impact, and is generally renewable.

SUMMARY OF THE INVENTION

The present invention provides in at least one embodiment a method for generating rotational movement. The method includes supporting an output shaft for rotational movement wherein the output shaft includes at least two one-way clutch mechanisms attached thereto with each one-way clutch mechanism configured to rotationally drive the output shaft in a first direction and to freely rotate relative to the output shaft in a second, opposite direction; positioning an infton assembly in association with each one-way clutch mechanism such that each infton assembly is surrounded by a buoyancy fluid and each infton assembly includes: a weighted member; an inflatable bladder associated with the weighted member; at least one inlet valve associated with an interior of the inflatable bladder; at least one outlet valve associated with the interior of the inflatable bladder; and a chain associated with the weighted member and extending over and drivingly engaging the respective one-way clutch mechanism; and controlling the inlet and outlet valves such that each inlet valve is opened to facilitate flow of a filling fluid having a density less than that of the buoyancy fluid into the respective inflatable bladder as the respective weighted member reaches a lower limit of travel and each outlet valve is opened to facilitate exhausting of the filling fluid within the respective inflatable bladder as the respective weighted member reaches an upper limit of travel.

In general, the present invention achieves rotation of an output shaft using a simple method utilizing Newton's law of gravity and the Archimedes principle of buoyancy.

BRIEF DESCRIPTION OF THE DRAWINGS

FIG. 9 is a perspective view of the output shaft.

FIGS. 12A-12F are schematic diagrams illustrating an exemplary startup sequence.

DETAILED DESCRIPTION

Figure 1:
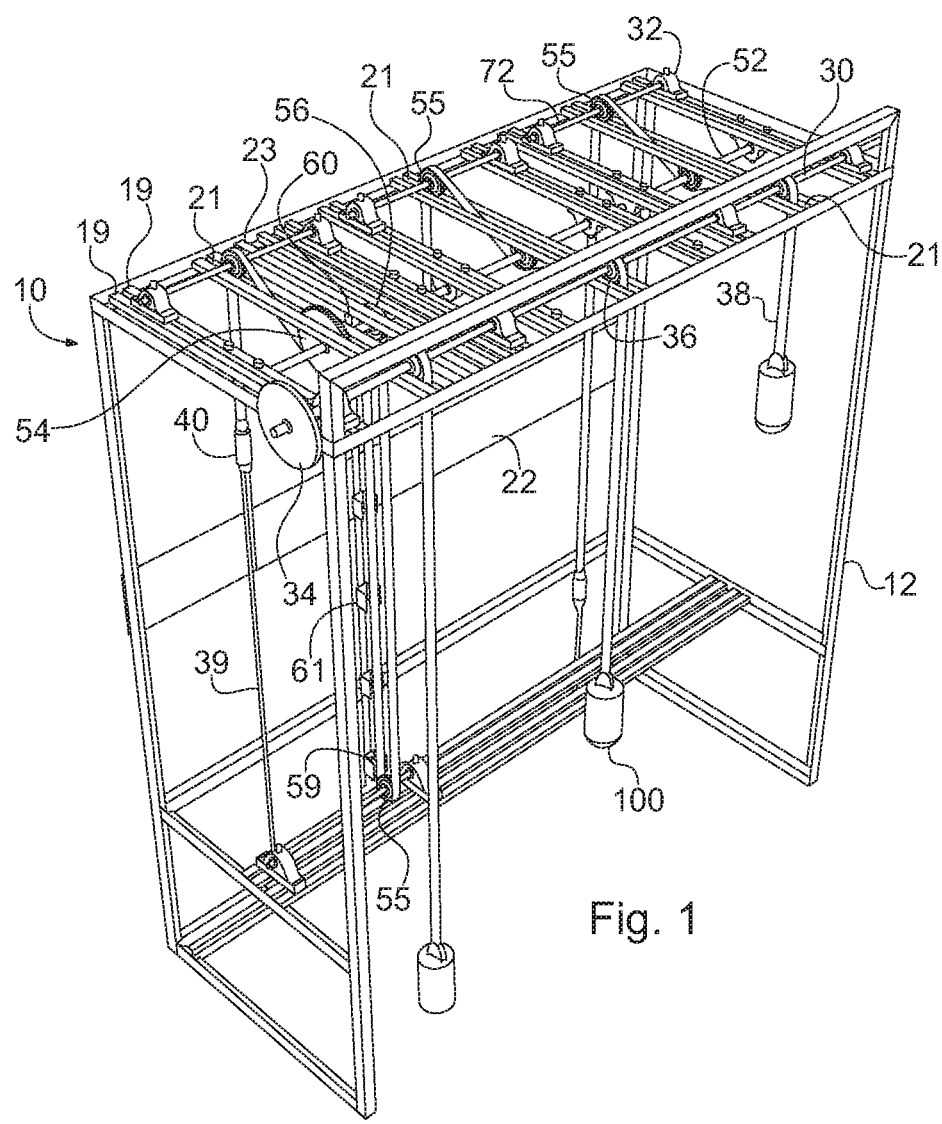
FIG. 1 is a perspective view of an exemplary shaft driving system in accordance with an embodiment of the invention. The illustrated shaft driving system includes three modules and the containers, illustrated in FIG. 15, are omitted for clarity.

Although the invention is illustrated and described herein with reference to specific embodiments, the invention is not intended to be limited to the details shown. Rather, various modifications may be made in the details within the scope and range of equivalents of the claims and without departing from the invention.

Referring to FIGS. 1-14, the general structure of an exemplary shaft driving system 10 in accordance with an embodiment of the invention will be described. The exemplary system 10 generally includes a frame 12, an output shaft assembly 30, a control assembly 50, an auxiliary shaft assembly 70, a plurality of containers 80, a plurality of inflatable pistons 100 (hereinafter "infton") and a fluid source 166. The exemplary shaft driving system 10 is illustrated with three inftons 100 and three corresponding containers 80, however, the system is not limited to such and can include two or more inftons 100.

Figure 2:
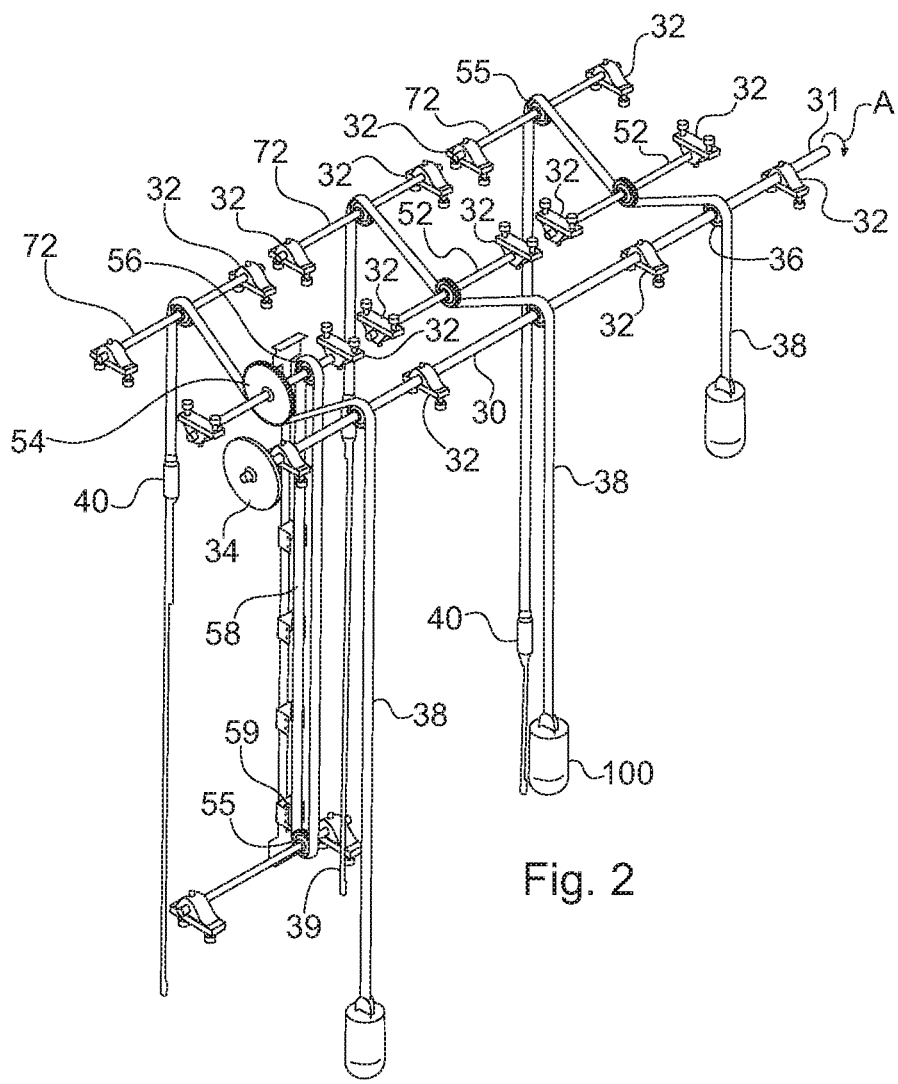
FIG. 2 is a perspective view similar to FIG. 1 with the frame omitted.

FIG. 2 illustrates the output shaft assembly 30, the control assembly 50, the auxiliary shaft assembly 70 and the inftons 100 without the frame 12 or containers 80 for clarity. Generally, each infton 100 extends from a drive chain 38, with the infton 100 configured to move upwardly and downwardly relative to the output shaft 31. Each drive chain 38 engages a respective one-way clutch mechanism 36 on the output shaft 31. The one-way clutch mechanisms 36 are configured such that the downward motion of the respective infton 100 rotates the clutch mechanism 36 which in turn drives rotation the output shaft 31, as indicated by arrow A in FIG. 2, while upward motion of the infton 100 causes the clutch mechanism 36 to rotate in the opposite direction, however, the clutch mechanism 36 freewheels relative to the output shaft 31 in the opposite direction and therefore the rotation of the output shaft 31 is not effected. The control assembly 50 guides the drive chains 38, but furthermore is configured to control the relative positioning of the inftons 100 to each other and to the output shaft 31 to maintain continuous rotation of output shaft 31. The auxiliary shaft assembly 70 provides further guidance of the drive chains 38 and provides a counter force on the ends of the drive chains 38 opposite the inftons 100. Each of these assemblies will be described in more detail.

Figure 3:
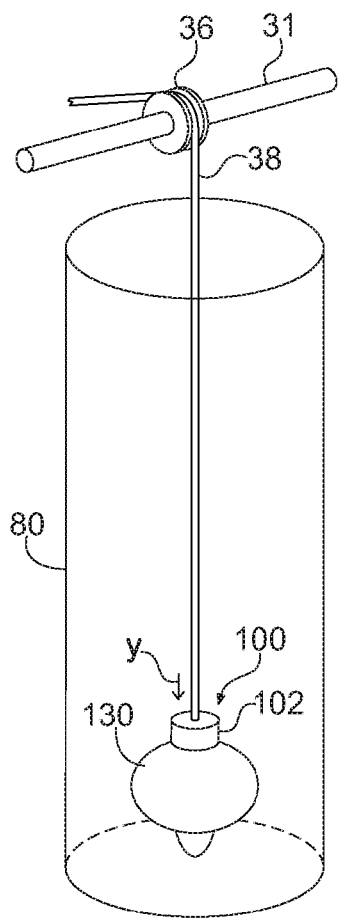
FIGS. 3-6 are perspective views illustrating the progression of the infton during a cycle with FIG. 3 illustrating a fluid intake condition, FIG. 4 illustrating a raising condition, FIG. 5 illustrating a discharge condition and FIG. 6 illustrating a falling condition.
Figure 4:
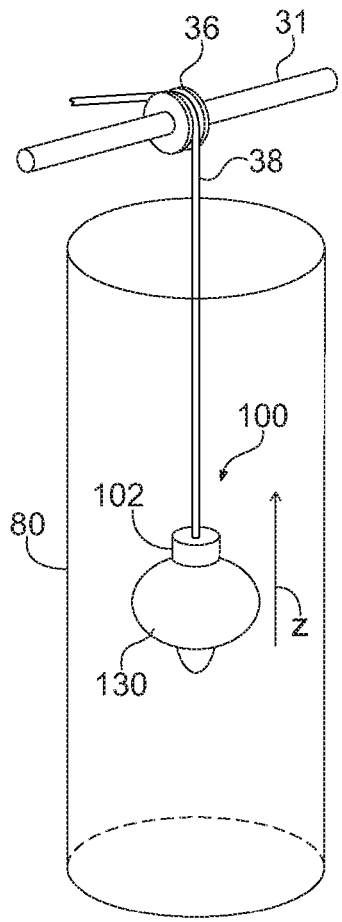
Figure 5:
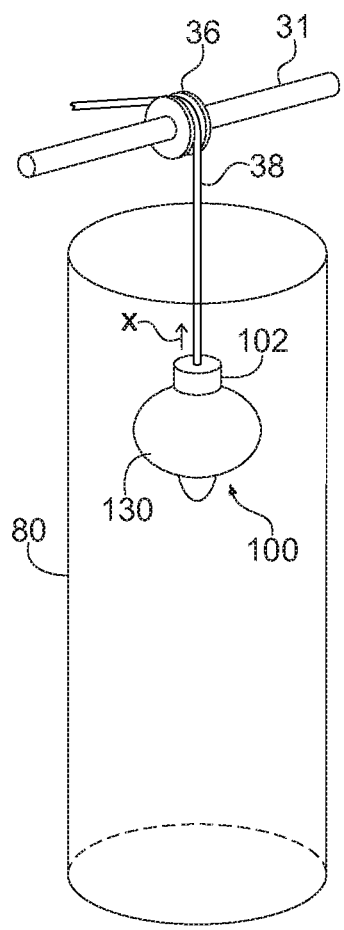
Figure 6:
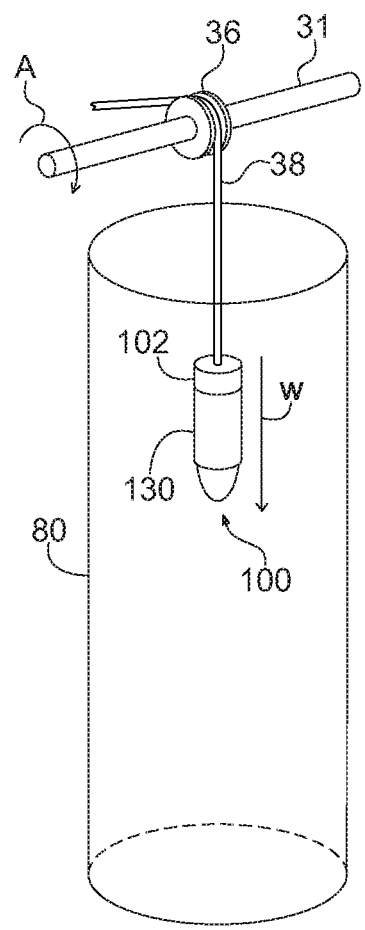

The upward and downward motion of the inftons 100 is achieved via the downward gravity force and an upward buoyancy force. Referring to FIGS. 3-6, a complete cycle of one of the inftons 100 is illustrated. In FIG. 3, the infton 100 reaches a bottom position and an inlet valve is activated such that filling fluid enters and inflates the inflatable bladder 130 of the infton 100, as indicated by arrow Y. The density of the filling fluid within the infton bladder 130 is less than the density of the buoyancy fluid in the container 80, such that a buoyancy force indicated at arrow Z forces the infton 100 toward the top of the container 80, as shown in FIG. 4. In a preferred embodiment, the filling fluid may be compressed air and the buoyancy fluid water, however, the invention is not limited to such. For example, in cold locations, the buoyancy fluid may be a selected antifreeze fluid and the filling fluid a corresponding fluid with a smaller density. The system 10 could be installed in a city building, i.e. close to the end distribution to minimize transmission loss, and the buoyancy fluid may be air while the filling fluid is helium. The possible fluid combinations are unlimited provided the filling fluid has a density less than the density of the buoyancy fluid. The materials selected for the infton 100, including the weighted member 102 and the bladder 130 are preferably selected to be compatible with fluids used in the system. For example, in fresh water, the weighted body 102 may be manufactured from stainless steel or bronze, but in salt water, may be manufactured from a plastic or composite material.

As the infton 100 rises, the drive chain 38 rotates the one-way clutch mechanism 36 in the freewheel direction such that the output shaft 31 is not effected. As the infton 100 approaches the top position, the outlet valve is activated to discharge the filling fluid as indicated by arrow X in FIG. 5. Upon discharge of the filling fluid from the bladder 130, the density of the unfilled infton 100 is greater than the buoyancy fluid and the infton 100 moves downward due to the force of gravity as indicated by arrow W in FIG. 6. As the infton 100 moves downward, the drive chain 38 rotates the one-way clutch mechanism in the driving direction such that the output shaft 31 is rotated as indicated by arrow A. The length of the drive chain 38 and the corresponding length of travel of the infton 100 may be any desired length. The depth of the buoyancy fluid will be at least or greater than the length of the travel. The greater the length of travel, the more revolutions per minute may be generated.

To ensure continuous rotation of the output shaft 31, it is preferable that the inftons 100 are synchronized such that at least one infton 100 is always moving downward. It is preferable for a given pair of inftons 100, the filling of one infton 100 and the discharge of a corresponding infton 100 will be configured such that the time of travel from the bottom position to the top position is equal to or slightly less than the time of travel from the top position to the bottom position. As such, if the inftons 100 are started at opposite positions, i.e. one at the top position and one at the bottom position, they will remain synchronized such that one infton will reach the top position and begin falling at the same time the other infton 100 reaches the bottom position and then begins to rise.

Figure 7:
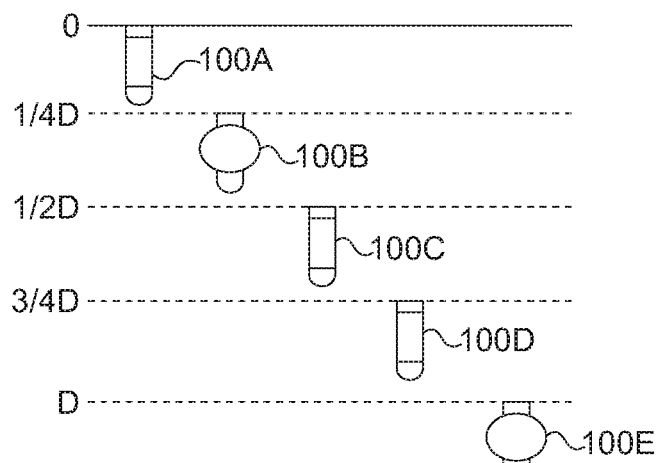
FIG. 7 is a schematic diagram illustrating an exemplary relative positioning of the inftons within a given module.

Referring to FIG. 7, the inclusion of multiple inftons 100A-100E further ensures that at least one infton 100 is always moving downward and thereby rotating the output shaft 31. It is preferable that the inftons 100A-100E are synchronized in pairs that are spaced apart by one full travel length D. For example, infton 100A is at the top position (0D) about to fall while the paired infton 100E is at the bottom position (D) about to rise while infton 100B is rising at position ¼D while paired infton 100D is falling at position ¾D. It will be understood, with equivalent travel rates, infton 100B will reach the top position at the same time that infton 100D reaches the bottom position. In the illustrated example, there are an odd number of inftons 100 and unpaired infton 100C is at a middle position (½D).

The positioning of the multiple inftons 100 preferably follows the formula $$\sum D_{1\ldots N} \le \frac{N \cdot T}{2}$$

wherein N is the number of inftons 100 within a given set, D is the distance the infton of the given set is from the top position at a given moment and T equals the total distance of travel between the lower limit of travel (bottom position) and the upper limit of travel (top position). When the $\Sigma D_{1\ldots N}$ is equal, the inftons 100 are falling and rising at the same speed. When the $\Sigma D_{1\ldots N}$ is less than, the inftons 100 are rising slightly faster than they are rising.

Figure 8A:
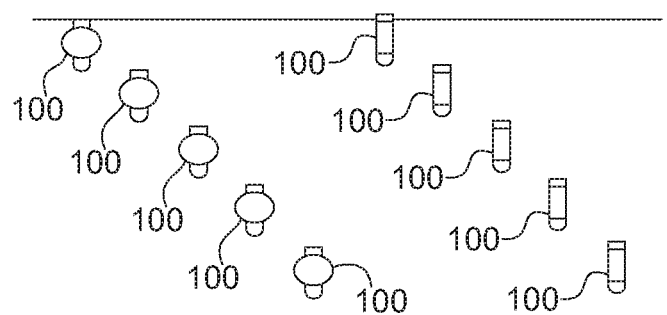
FIGS. 8A-8C are schematic diagrams illustrating additional exemplary relative positioning of the inftons within a given module.
Figure 8B:
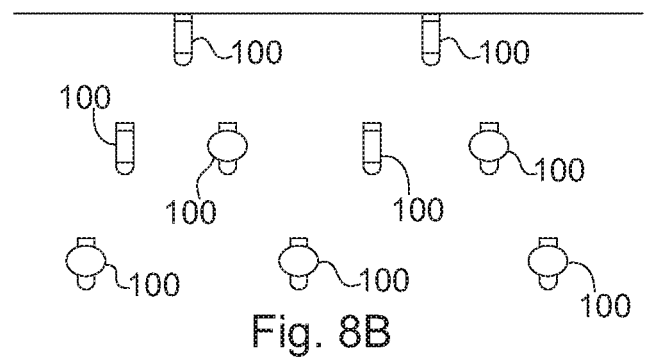
Figure 8C:
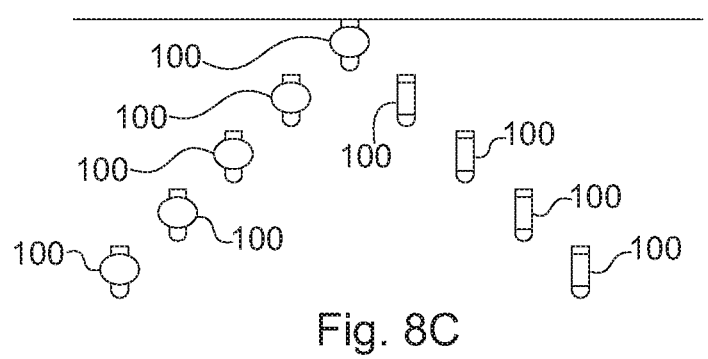

Referring to FIGS. 8A-8C, exemplary synchronization patters are shown. In FIG. 8A, the infton 100 positions repeat, with the paired inftons 100 being one set apart such that one set is rising while the other is falling. FIG. 8B illustrates a mixed pattern with the paired inftons 100 offset from one another by one intermediate infton 100. Such a pattern may provide a more balanced force on the output shaft 31. FIG. 8C illustrates a mirrored pattern with a balanced force extending toward the ends of the output shaft 31. Any desired pattern of two or more inftons 100 may be utilized. Each set of inftons 100, which may be repeated across the output shaft 31, preferably follows the formula set forth above.

Referring to FIG. 9, the exemplary output shaft assembly 30 will be described. The output shaft assembly 30 includes an output shaft 31 supported by a plurality of support bearings 32. The output shaft 31 is preferably a continuous structure, but may be formed of multiple shaft segments configured to rotate in concert. One end of the output shaft 31 includes an output gear 34 configured to provide the input to the ultimate output device (not shown), e.g. a gear box of generator or a ship drive system. While an output gear 34 is shown, such may not be necessary as the output shaft 31 may directly drive the output device. Additionally, the output shaft 31 may be configured to drive multiple output devices, for example, by engaging the output gear 34 with a transmission system. In an illustrative embodiment, the transmission system may be utilized in conjunction with a ship drive system and shift through different propeller speeds and also a generation gear box for generating and storing electricity when the propeller is not in use since the output shaft 31 will provide continuous rotation while in operation.

A plurality of one-way clutch mechanisms 36, one for each infton 100, are attached to the output shaft 31. In the illustrated embodiment, the clutch mechanisms 36 have external teeth 37 to engage links in the respective drive chains 38, however, other drive configurations, e.g. grooved or flat friction surfaces in conjunction with friction belts may be utilized. The one-way clutch mechanisms 36 may have any desired configuration, for example, but not limited to, a sprag clutch, a ratchet clutch or an overrunning clutch, provided the clutch mechanism 36 drives the output shaft 31 when rotated in a first direction and free wheels relative to the output shaft 31 when rotated in the opposite direction. The outer diameter of the clutch mechanism 36 is preferably as close to the diameter of the output shaft 31 as possible, such that each rotation of the drive mechanism 36 in the drive direction results in as near as possible a complete rotation of the output shaft 31. A flywheel (not shown) may be connected to the output shaft 31 to help steady rotation of the shaft 31 and minimize the possibility of speed fluctuations as the inftons 100 transition from upward movement to downward movement.

Figure 10:
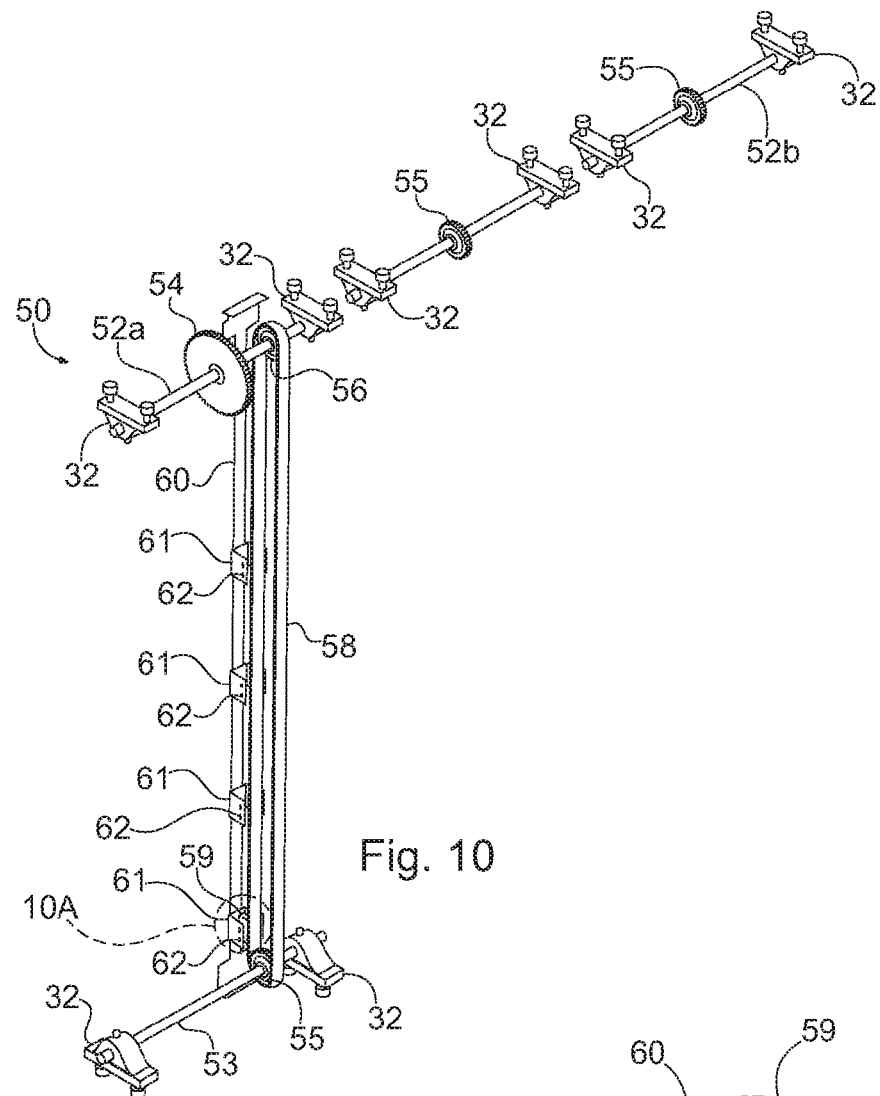
FIG. 10 is a perspective view of the control shaft.
Figure 10A:
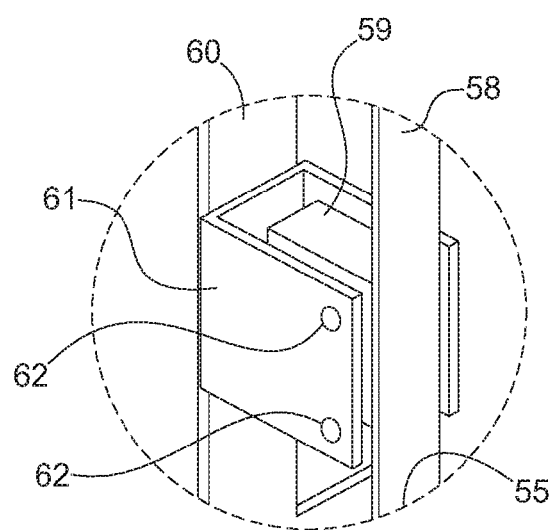

Referring to FIG. 10, an exemplary control assembly 50 is illustrated. In the illustrated embodiment, the control assembly 50 includes a control shaft 52a, 52b associated with each infton 100 and respective clutch mechanism 36. The control shafts 52a, 52b are supported via support bearings 32. The control shaft 52a drives the control chain 58, while the remaining control shafts 52b of the illustrated embodiment are passive and are configured to help guide the path of the respective drive chains 38. Each of the control shafts 52b includes a passive gear 55 which is configured to rotate and guide the chain 38 in both directions of travel. The passive gears 55 may be fixed gear teeth such that the shafts 52b rotate relative to the support bearings 32, or the shafts 52b may be fixed relative to the support bearings 32 and the passive gears 55 rotate relative to the shaft 52b.

The control shaft 52a has a large control gear 54 mounted thereon. The larger control gear 54 is axially aligned with one of the one-way clutch mechanisms 36 such that the drive chain 38 thereof passes about and drives the larger control gear 54. The larger control gear 54 is fixed to the control shaft 52a such that rotation of the gear 54 in either direction causes corresponding rotation of the shaft 52a. A small control gear 56 is also fixed to the control shaft 52a such that rotation of the shaft 52a in either direction causes rotation of the small control gear 56 in the corresponding direction. A control chain 58 extends between the small control gear 56 and a passive gear 55 on a spacer shaft 53 spaced from the shaft 52a such that rotation of the shaft 52a causes a control block 59 connected to the control chain 58 to move upward or downward. Since the drive chain 38 connected to one of the inftons 100 causes rotation of large control gear 54 and thereby the shaft 52a and the small control gear 56, movement of the control block 59 will correspond to the movement of the infton 100. The gear ratio between the large control gear 54 and the small control gear 56 will dictate the relative distance of movement between the infton 100 and the control block 59. For example, if the gears 54, 56 have a 4:1 ratio, the block 59 will move 25 feet in response to the infton 100 moving 100 feet. The ratio can be designed to any desired ratio according to the sizing of the various assemblies.

In the illustrated embodiment, the control block 59 is configured to pass through a number of control brackets 61 as it travels in conjunction with the infton 100. Each control bracket 61 has one or more sensors 62 mounted thereon. For example, the sensors 62 may be infra red proximity sensors. When the control block 59 is aligned with the sensor 62, the block 59 breaks the infra red path, thereby indicating to the sensor 62 the position of the control block 59, which in turn indicates the corresponding position of the given infton 100. Other types of sensors may be utilized, for example but not limited to, hall-effect sensors, reed switches and inductive sensors. As shown, a number of brackets 61 and sensors 62 may be provided, with the brackets 61 supported on a control support plate 60 positioned proximate the control chain 28.

Preferably, two sensors 62 are provided for each infton 100, i.e., in the illustrated embodiment with three inftons 100, six sensors 62 are provided and supported on four brackets 61, although more or fewer brackets may be utilized. One sensor 62 of each pair indicates when the infton 100 is approaching a top position wherein the control system releases pressure in the infton 100 and the other sensor 62 of the pair indicates when the infton 100 is approaching a bottom position wherein the control system inflates the infton 100. By knowing and maintaining the relative position between the three inftons 100, as will be described in more detail hereinafter, a single control chain 58 and control block 59 may be utilized to monitor the position of only one infton 100 as illustrated.

Figure 11A:
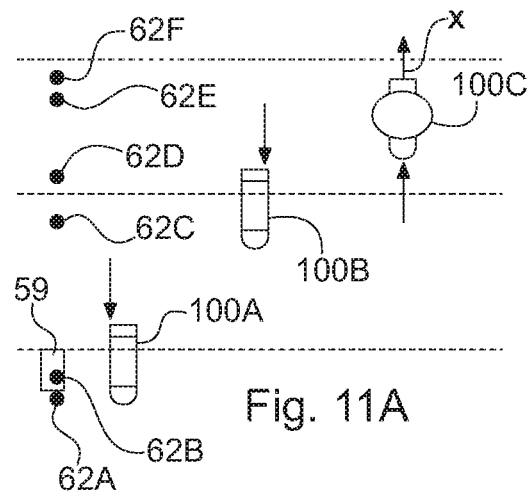
FIGS. 11A-11F are schematic diagrams illustrating an exemplary control system.
Figure 11B:
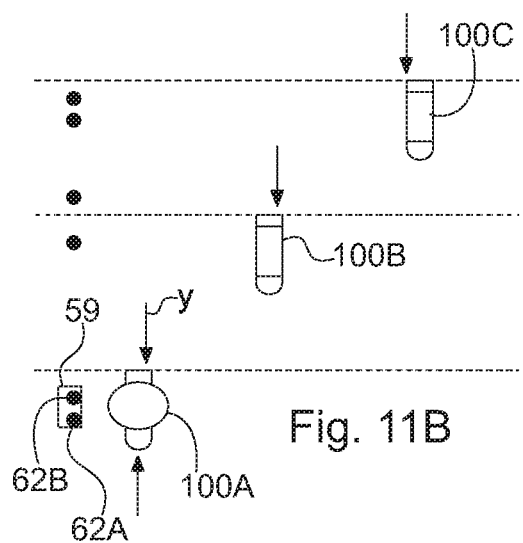

For example, FIGS. 11A-11F schematic illustrate the control of the three inftons 100 in the exemplary embodiment controlled based on the position of one of the inftons 100A with the control block 59 moving therewith. To ensure continuous rotation of the output shaft 31, the inftons 100A, 100B, 100C are preferably configured such that the inftons 100A, 100B, 100C are spaced by one-half the total travel distance such that when infton 100A is at the bottom position, infton 100B is at a mid position and infton 100C is at the top position, as shown in FIG. 11B. Referring back to FIG. 11A, just prior to infton 100C reaching the top position, the control block 59 triggers sensor 62b which opens the outlet valve of infton 100C and the fluid is discharged as indicated by arrow X. The opening prior to reaching the top position provides time for the infton 100C to completely deflate by the time it reaches the top position. Moving to FIG. 11B, when the infton 100A reaches the bottom position, the control block 59 triggers the sensor 62a which opens the inlet valve of infton 100A and the infton 100A is inflated as indicated by arrow Y.

Figure 11C:
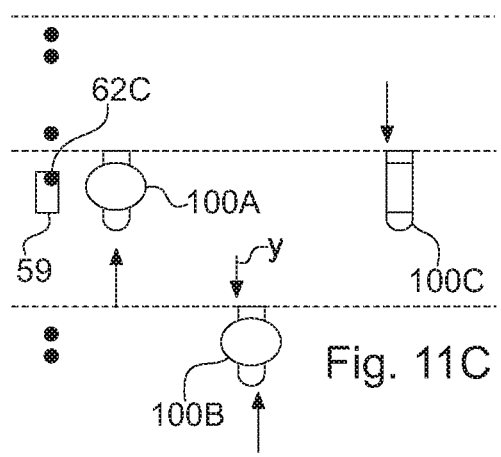
Figure 11D:
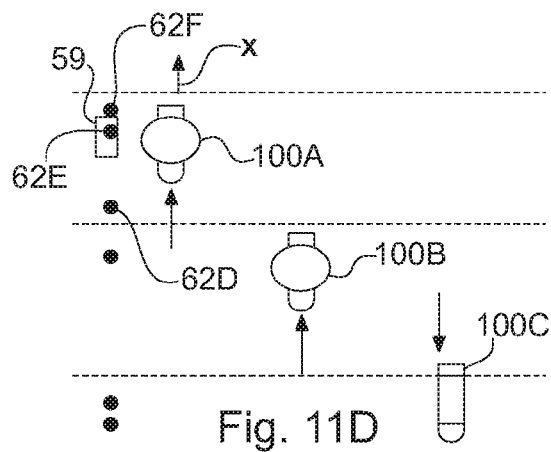
Figure 11E:
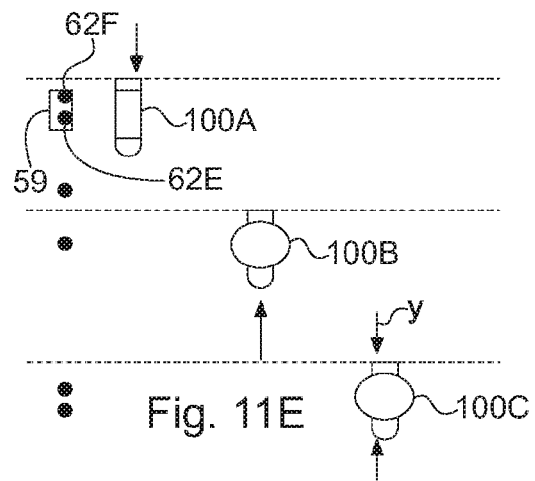

Sensor 62c is associated with the inlet valve of infton 100B and is positioned such that the control block 59, while traveling in an upward direction, will trigger the sensor 62c when the infton 100B is at the bottom position as shown in FIG. 11C. Referring to FIG. 11D, it is noted that during the upward travel of infton 100A, the control block passes sensor 62d which is associated with the outlet valve of infton 100B, however, the control system is configured such that it knows whether the infton 100A is traveling upward or downward and triggering of sensor 62d only activates the associated valve when the infton 100A is traveling downward. Similarly, triggering of sensor 62c only activates the associated valve when the infton 100A is traveling upward.

Figure 11F:
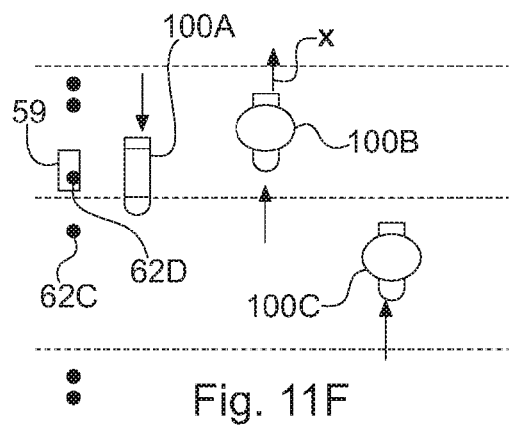

As shown in FIG. 11D, as infton 100A approaches the top position, the control block 59 triggers sensor 62e which activates the outlet valve of infton 100A and the fluid is discharged as indicated by arrow X. Moving to FIG. 11E, upon infton 100A reaching the top position, the control block 59 triggers the sensor 62f which opens the inlet valve of infton 100C and the infton 100C is inflated as indicated by arrow Y. FIG. 11F illustrates the downward travel of infton 100A as it passes sensor 62d, thereby triggering sensor 62d which activates the outlet valve of infton 100B and the fluid is discharged as indicated by arrow X. The cycle continuously repeats thereafter to provide continuous rotation of the output shaft 31. While the illustrated embodiment includes a single control chain 58 aligned with all of the sensors 62, the system is not limited to such. For example, a second control chain (not shown) may be employed, with half of the sensors aligned with each chain. In such an embodiment, one chain and sensor combination may control the inlet valves while the other chain and sensor combination may control the outlet valves. Any desired arrangement may be utilized.

Furthermore, while the exemplary embodiment includes a control chain 58, a control block 59 and spaced apart infra red proximity sensors 62, the invention is not limited to such and may utilize any system of monitoring the position of the inftons 100 and activating the inlet and outlet valves at the appropriate time to maintain a desired synchronization. For example, the control assembly may include a rotary encoder attached to control shaft 52a which monitors rotation of the shaft 52a and determines the position of the infton 52A from the shaft rotation. Other exemplary systems include, but are not limited to, linear or rotary variable differential transformers, string potentiometers, linear encoders and photodiode arrays.

Figure 12D:
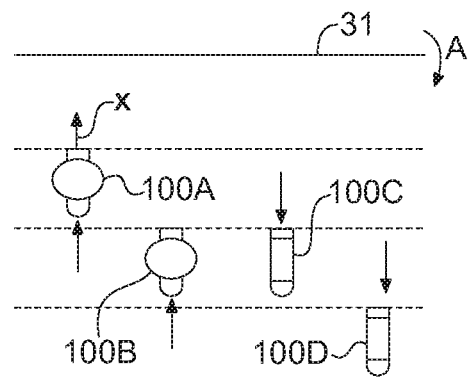
Figure 12E:
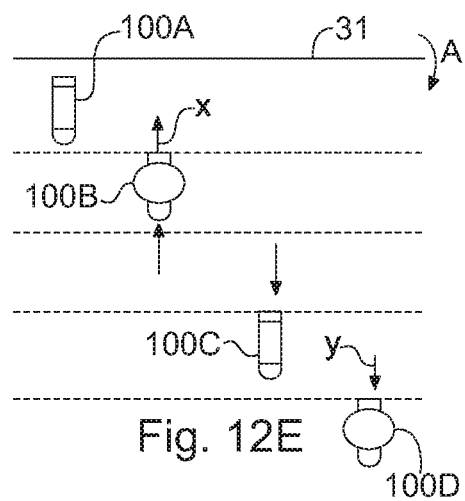
Figure 12F:
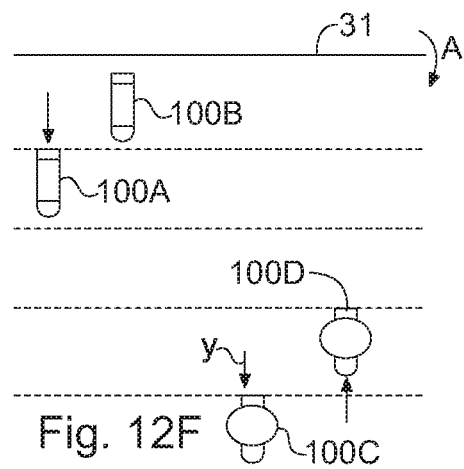

Referring to FIGS. 12A-12F, an exemplary start-up synchronization is illustrated. At start-up illustrated in 12A, two inftons 100A, 100B are positioned at the bottom position and two inftons 100C, 100D are retained at the top position. At that moment, the infton 100A is filled with filling fluid as indicated by arrow Y and infton 100D is released. The infton 100A begins to rise and the infton 100D begins to fall as illustrated in FIG. 12B. When infton 100A reaches approximately ¼ of its travel distance, infton 100B is filled with filling fluid as indicated by arrow Y and infton 100C is released. The infton 100B begins to rise and the infton 100C begins to fall as illustrated in FIG. 12C. The inftons 100A-100D are now synchronized to the desired pattern of inftons rising and falling and will continue the cycle as illustrated in FIGS. 12D-12F.

Figure 13:
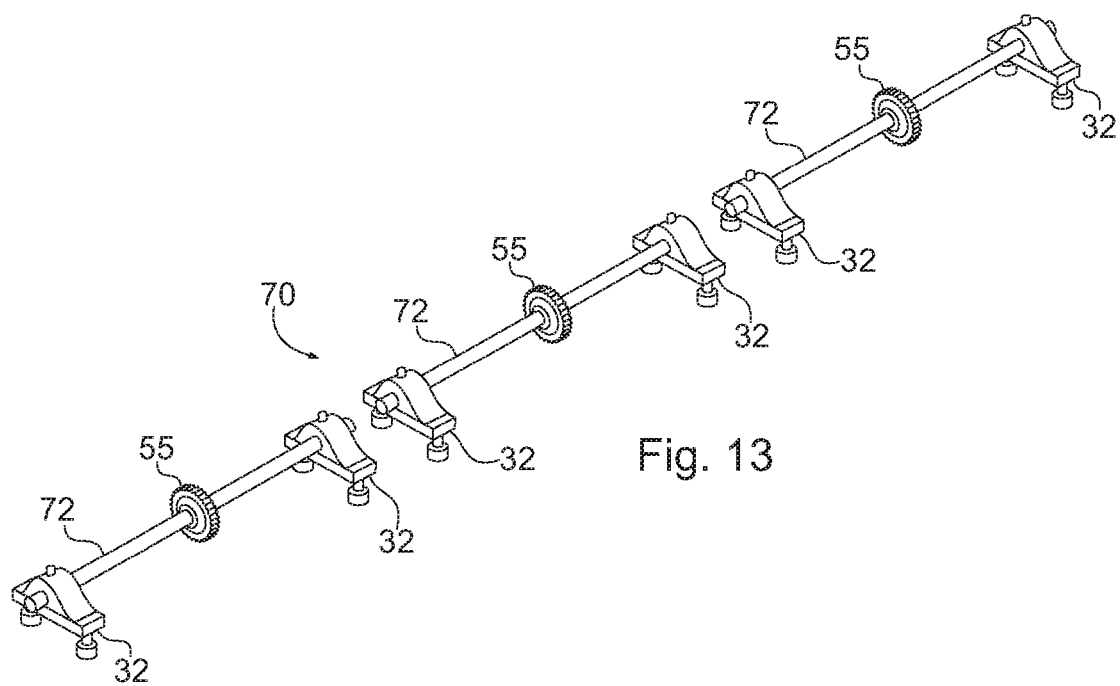
FIG. 13 is a perspective view of the auxiliary shaft assembly. In the illustrated embodiment, the auxiliary shaft assembly includes three identical shafts for the three modules.

Referring to FIGS. 1, 2 and 13, the auxiliary shaft assembly 70 includes an auxiliary shaft 72 associated with each infton 100 and respective clutch mechanism 36. The auxiliary shafts 72 are supported via support bearings 32. Each of the auxiliary shafts 72 includes a passive gear 55 which is configured to rotate and guide the chain 38 in both directions of travel. The passive gears 55 may be fixed gear teeth such that the shafts 72 rotate relative to the support bearings 32, or the shafts 72 may be fixed relative to the support bearings 32 and the passive gears 55 rotate relative to the shaft 72.

The passive gears 55 guide the free end of the drive chain 38 to a fixed connection. In the illustrated embodiment, a counterweight 40 is connected to the free end of the drive chain 38, which is connected to a connection wire 39 which in turn is connected to a connection plate 15 of the frame 12 (see FIG. 14). The counterweight 40 weighs less than the respective infton 100, but assists in raising the infton 100 from the bottom position to the top position. The connection wire 39 prevents uncontrolled movement of the free end of the drive chain 38. The connection wire 39 may take various forms, for example, a coil spring, a flexible wire which simply collapses as the infton 100 moves upward or a flexible wire within a spring loaded coiling assembly which winds up the flexible wire as the infton moves upward. Other mechanisms may alternatively be used to control the free end of the drive chain 38.

Figure 14:
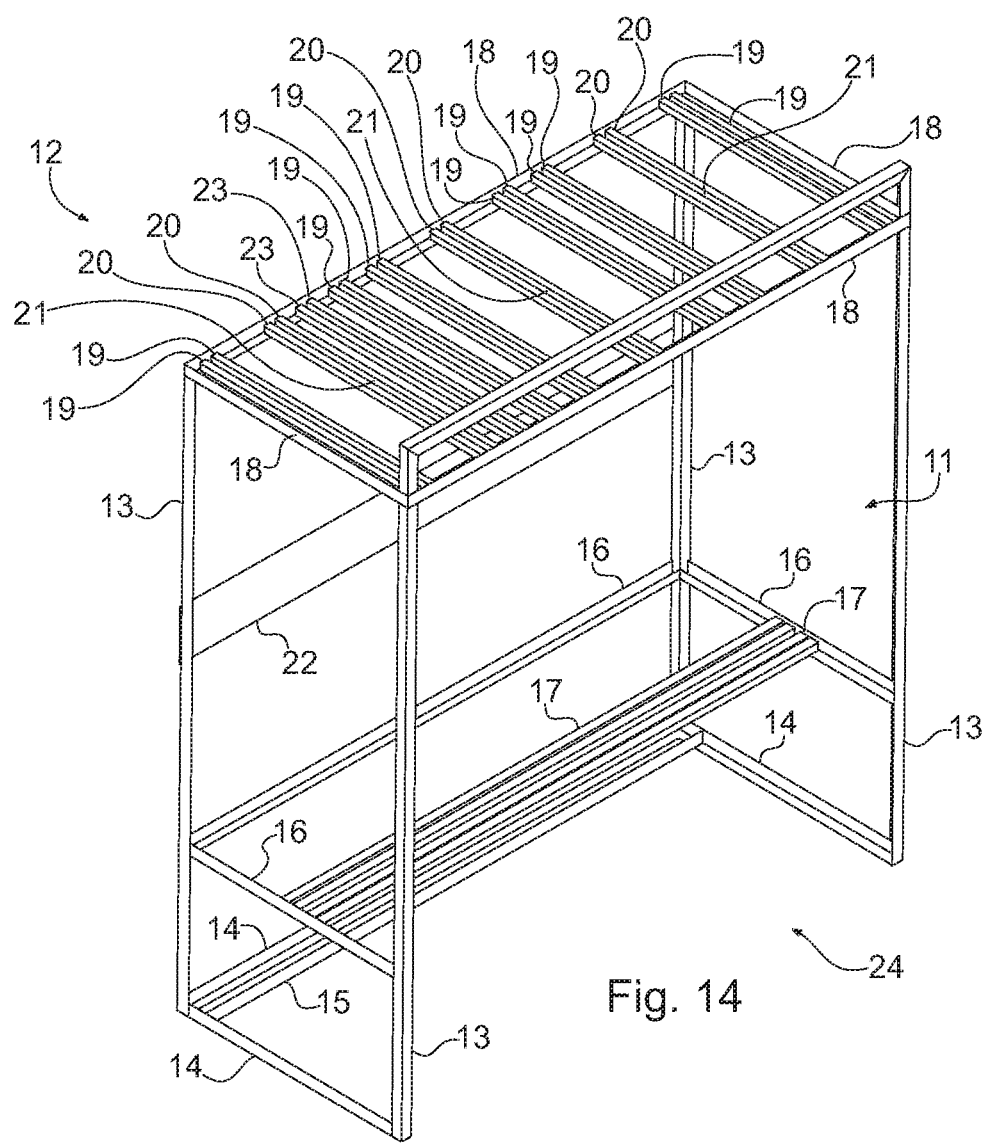
FIG. 14 is a perspective view of the frame.
Figure 15:
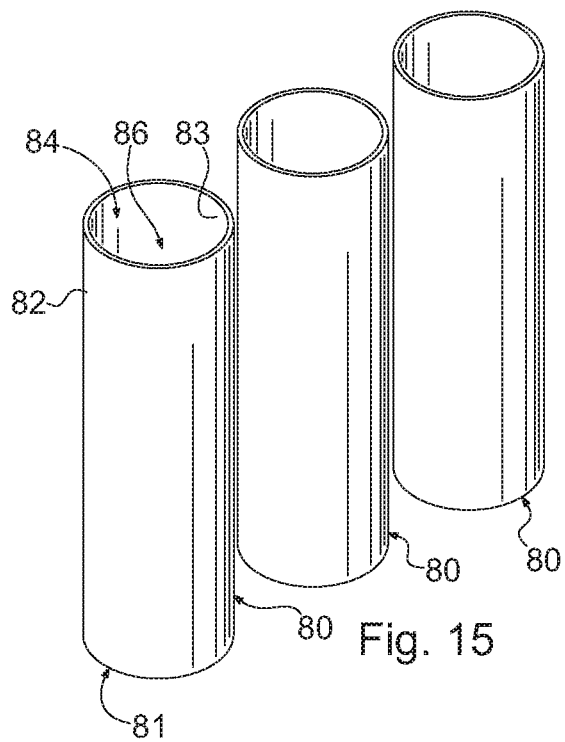
FIG. 15 is a perspective view of the three containers of the exemplary embodiment of the invention illustrated in FIG. 1.
Figure 16:
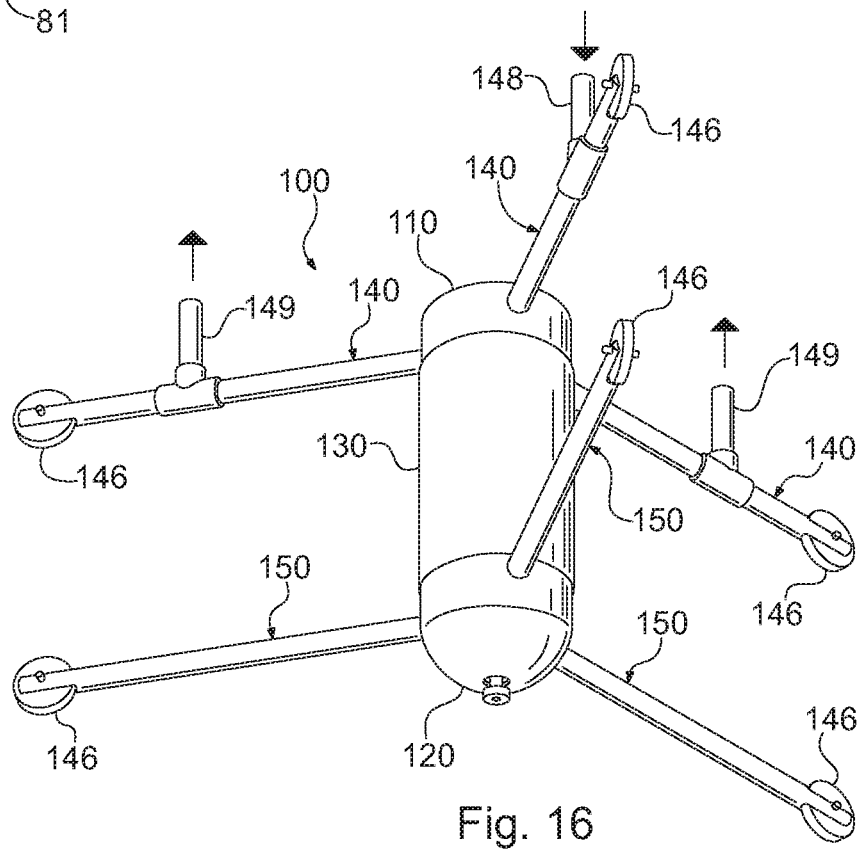
FIG. 16 is a perspective view of an exemplary infton of the exemplary embodiment of the invention illustrated in FIG. 1.

Referring to FIGS. 1, 14 and 15, the exemplary frame 12 and containers will be described. The exemplary frame 12 includes four corner posts 13 connected at their bottoms by bottom rails 14 and at their tops by top rails 18. Intermediate rails 16 extend between the posts 13 between the bottom and top rails 14 and 18 and support a support platform 17 utilized to support the spacer shaft 53. In the illustrated embodiment, the bottom and intermediate rails 14 and 16 extend about only three sides of the frame 12 such that the front 11 thereof is open to a container area 24 configured to receive the containers 80. As shown in FIG. 15, the exemplary embodiment includes a separate container 80 for each infton 100 assembly, however, the invention is not limited to such and the individual containers 80 may be replaced by a single container configured to receive all of the inftons 100. Each container 80 has a side wall 82 extending from a closed end 81 to an open end 84 with an interior surface 83 of the wall 82 defining a fluid chamber 86 therein configured to hold a buoyancy fluid. Referring again to FIG. 14, the top rails 18 of the frame 12 support a plurality of support rails 19, 23 and guide rails 20. The support rails 19 are configured to support support bearings 32 and the support rails 23 are configured to support an end of the control support plate 60 (see FIG. 1). The guide rails 20 are positioned in pairs with a guide slot 21 between the rails 20. Each guide slot 21 is configured to receive and guide a respective drive chain 38 as shown in FIG. 1. Stops (not shown) may be provided to define the upper limit of travel of the infton 100 and/or counterweight 40. A control board 22 extends between the rear posts 13 to support the control valves, regulator valves and outlet valves described hereinafter.

The illustrated embodiment allows for a modular system 10. To increase the size of the system 10, multiple frames 12 with corresponding inftons 100 and containers 80 may be connected together. The output shafts 31 of the various modules can also be connected together. While the invention is illustrated using a frame 12 and specific containers 80, the invention is not limited to such. For example, the system 10 may be utilized in a body of water, e.g. an ocean or lake, such that the body of water provides the necessary buoyant fluid and containers are not necessary. Similarly, the shafts and the like may be supported on environmental structures, e.g. shorelines, jetties, docks or the like, or on alternative frame structures, e.g. platforms or the like.

Referring to FIGS. 16-24, an exemplary embodiment of an infton 100 will be described. The illustrated infton 100 is configured for use with the cylindrical containers 80 illustrated in FIG. 15, but may have other configurations depending on the configuration of the fluid container.

Figure 18:
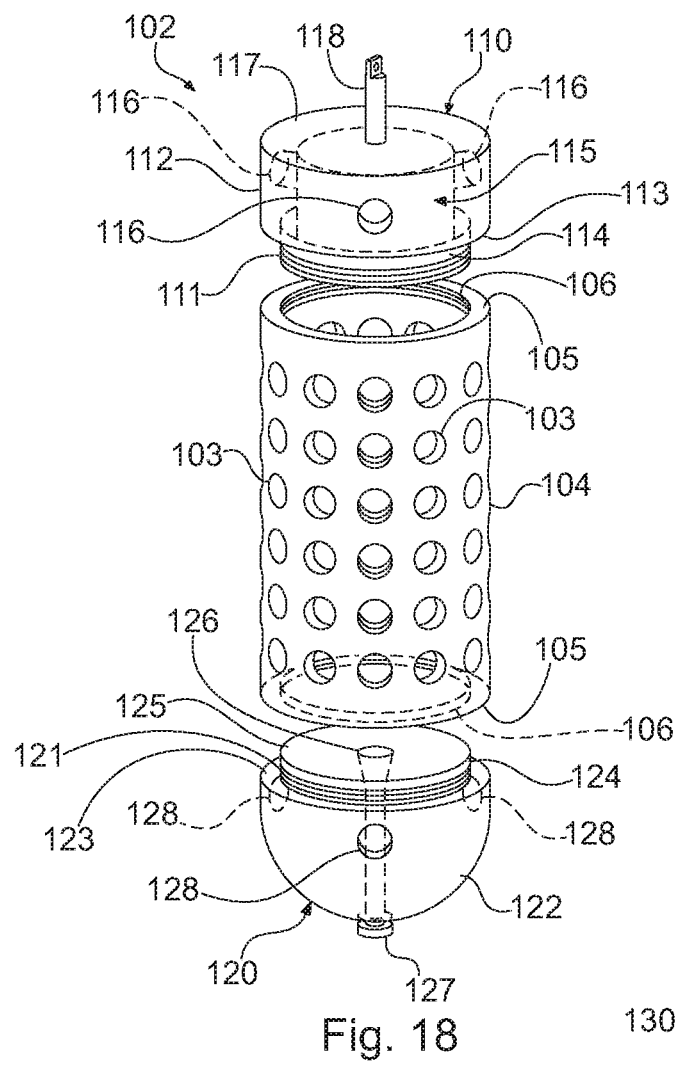
FIG. 18. is an exploded perspective view of the weighted member of the infton of FIG. 16.
Figure 19:
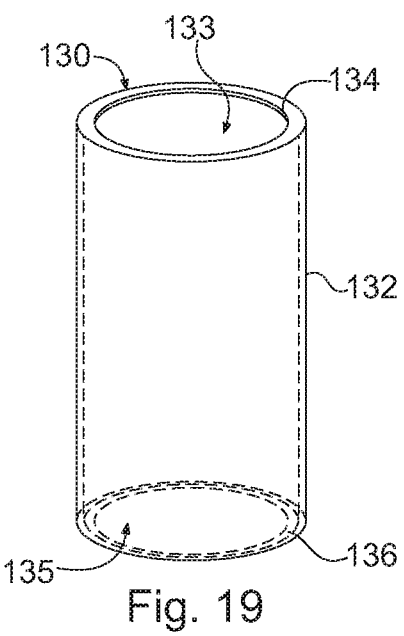
FIG. 19 is a perspective view of the inflatable bladder of the infton of FIG. 16.
Figure 20:
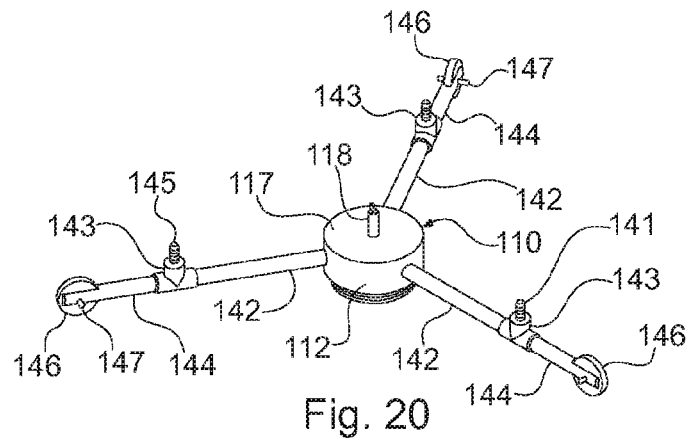
FIG. 20 is a perspective view of the upper portion of the infton of FIG. 16.
Figure 21:
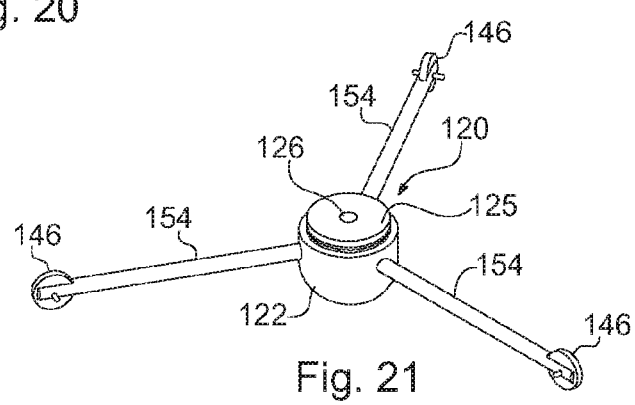
FIG. 21 is a perspective view of the lower portion of the infton of FIG. 16.

Generally, each infton 100 includes a weighted member 102 and an inflatable bladder 130 attached thereto. Referring to FIG. 18, the weighted member 102 of the present embodiment includes a hollow cylindrical body 104, an upper member 110 and a lower member 120. The hollow cylindrical body 104 includes a plurality of through holes 103 which facilitates passage of the expansion fluid into the inflatable bladder 130. Each end 105 of the cylindrical body 104 includes internal threads 106 configured to engage the external threads 111, 121, respectively, of the upper and lower members 110, 120.

The upper member 110 has a cylindrical wall 112 extending from a closed end surface 117 to a shoulder 113 which transitions to an inner wall 114 which defines the external threads 111. The cylindrical wall 112 has an outer diameter slightly greater than the outer diameter cylindrical body 104 such that the outer surface of the inflatable bladder 130 may align with the cylindrical wall 112 outer surface when the inflatable bladder 130 is positioned about the cylindrical body 104 and is in an un-inflated condition (see FIG. 16). The cylindrical wall 112 defines an internal chamber 115 which is in fluid communication with the hollow body 104 when the upper member 110 is connected to the body 104. Through holes 116 extend from the outside surface of the cylindrical wall 112 to the internal chamber 115 and will facilitate fluid flow into and out of the infton 100 as described hereinafter. An attachment member 118 configured to connect to the drive chain 38 extends from the end surface 117.

The lower member 120 has a generally solid hemisphical body 122 with a shoulder 123 extending to an inner wall 124 including the external threads 121. The body 122 has a maximum outer diameter slightly greater than the outer diameter cylindrical body 104 such that the outer surface of the inflatable bladder 130 may align with the adjacent portion of hemispherical body 122 when the inflatable bladder 130 is positioned about the cylindrical body 104 and is in an un-inflated condition (see FIG. 16). With the hemispherical shape of the body 122 and the continuous surface defined by the upper member wall 112, the bladder 130 outer surface and the hemisphical body 122, the infton 100 is relatively fluid dynamic such that resistance during downward movement is minimal. An inner end surface 125 of the lower member 120 preferably includes a drain passage 126 that extends through the body 122 to a drain valve 127. The drain valve 127 facilitates removal of any buoyancy fluid that may inadvertently enter within the infton 100. The hemispherical body 122 includes a plurality of blind bores 128 configured to receive guide rods 150 as described below.

The weighted member 102 components may be manufactured from various metals, plastics, composites or other desired materials. The materials should be chosen to provide a desired mass for the weighted member 102 and to be resistive to corrosion within the buoyancy fluid.

The inflatable bladder 130 is manufactured from an elastic material. In the illustrated embodiment, the inflatable bladder 130 includes a hollow cylindrical wall 132 with a radially extending rim 134, 136 at each end. A through passage 133, 135 extends through each rim 134, 136. The through passages 133, 135 each have an inner diameter which is approximately equal to the outer diameter of the respective inner wall 114, 124. The inflatable bladder 130 is positioned about the cylindrical body 104 with the rims 134, 136 overlying the respective ends 105 of the body 104. When the upper and lower members 110, 120 are secured to the body 104, the rims 134, 136 are sandwiched between the respective shoulder 113, 123 and end 105 of the body 104 to maintain the bladder 130 in position and to seal the infton 100.

Figure 22:
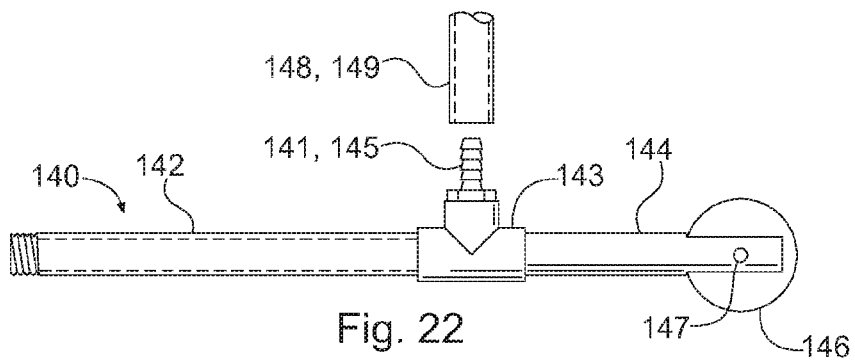
FIG. 22 is a side elevation view of an upper guide of the infton of FIG. 16.
Figure 23:
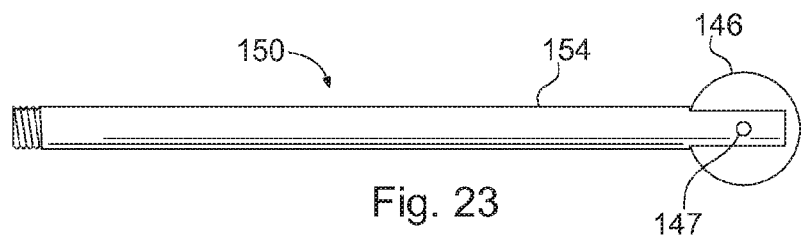
FIG. 23 is a side elevation view of a lower guide of the infton of FIG. 16.
Figure 24:
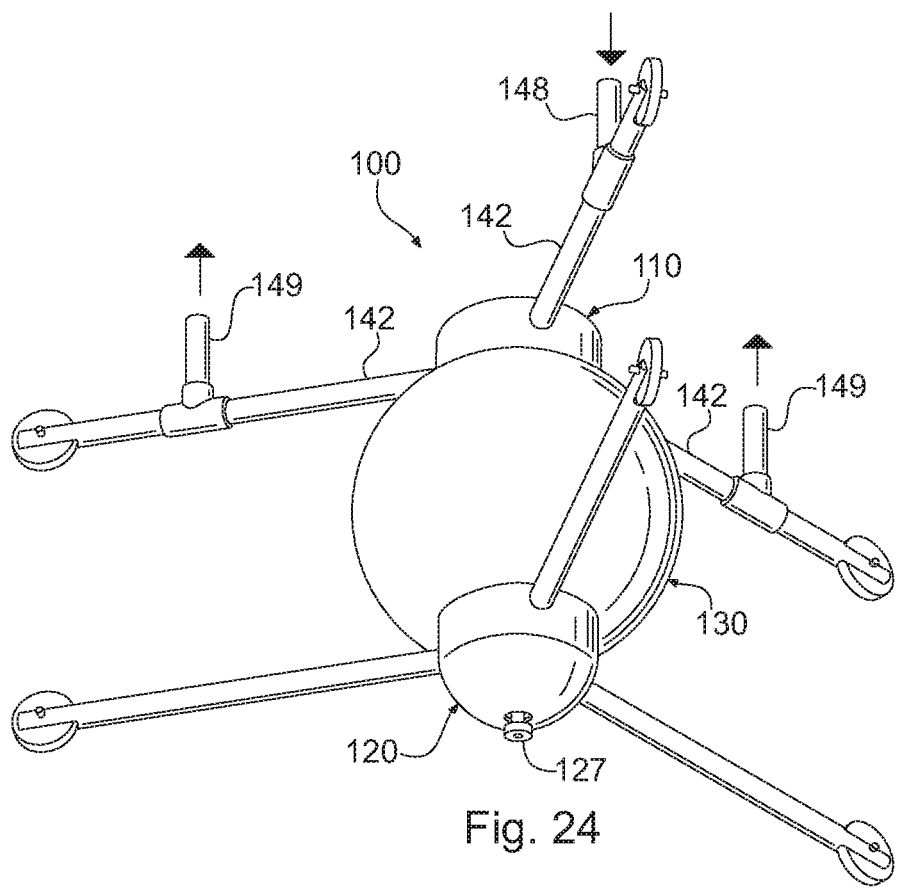
FIG. 24 is a perspective view of the infton of FIG. 16 with the inflatable bladder inflated.

Referring to FIGS. 16 and 20-23, the infton guide assembly will be described. An upper guide rod 140 is secured in each through hole 116 in the upper member 110 and a lower guide rod 150 is secured in each blind bore 128 in the lower member 120. While three upper and lower guide rods 140, 150 are illustrated, more or fewer may be utilized. The lower guide rods 150 help to stabilize the infton 100 relative to the container 80. Referring to FIG. 23, each lower guide rod 150 includes a solid pipe 154 configured for connection at one end to a respective blind bore 128 via any desired means, with a threaded connection illustrated. The solid pipe 154 terminates in a yoke configured to receive a wheel 146 supported by a pin 147 or the like. The wheels 146 are configured to roll along the inside surface 83 of the container 80. Other friction reducing structures, for example, slide blocks, may be utilized.

Figure 17:
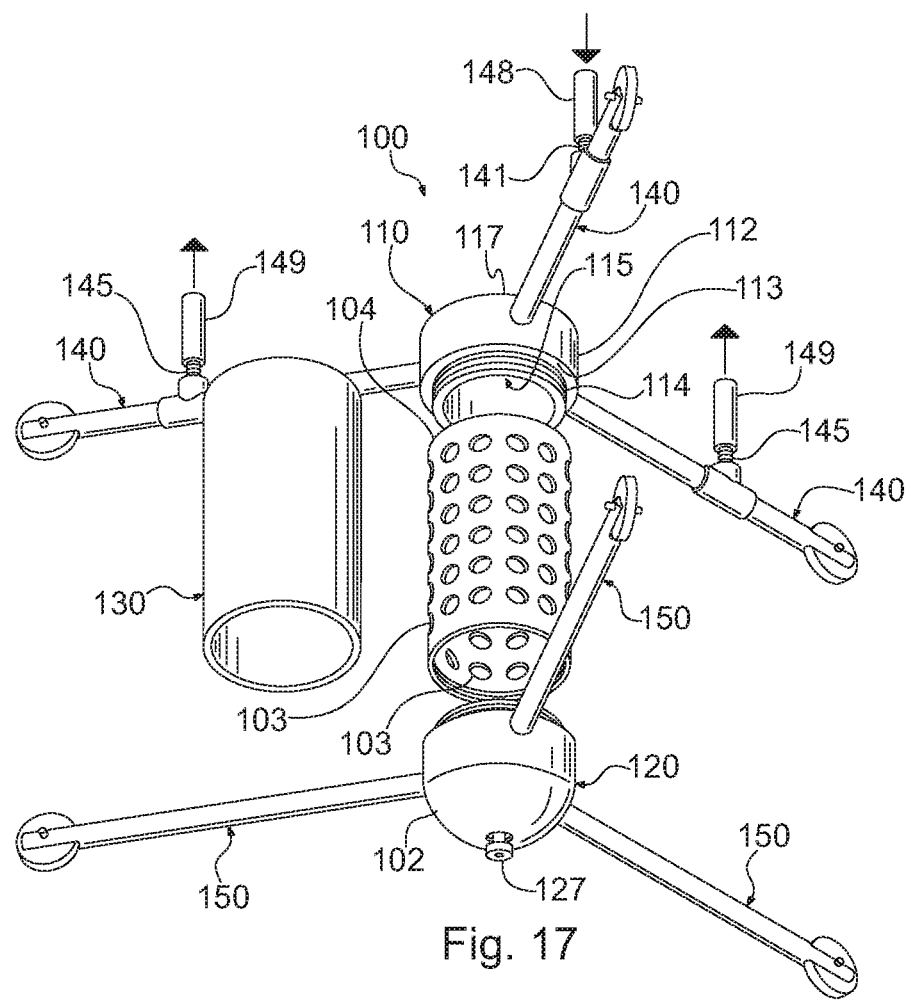
FIG. 17 is a an exploded perspective view of the infton of FIG. 16.

The upper guide rods 140 also help to stabilize the infton 100 relative to the container 80, but also define part of the fluid path for inflating and deflating the inflatable bladder 130. With reference to FIG. 22, the upper guide rod 140 includes a hollow pipe 142 configured to connection to a respective through hole 116, via any desired means, with a threaded connection illustrated. The hollow pipe 142 extends to a T-connector 143 which has a fluid inlet/outlet 141/145 on one branch and a solid pipe 144 extending from the other branch. The solid pipe 144 terminates in a yoke configured to receive a wheel 146 supported by a pin 147 or the like. The wheels 146 are configured to roll along the inside surface 83 of the container 80. Other friction reducing structures, for example, slide blocks, may be utilized. A fluid filling or discharge hose 148/149 is connected to the fluid inlet/outlet 141/145. While a barbed connection is illustrated, other connections, for example, a hose clamp, may be utilized. As shown in FIG. 17, the illustrated infton 100 includes one fluid inlet 141 connected to a fluid filling hose 148 and two fluid outlets 145 connected to respective fluid discharge hoses 149. Such a configuration is utilized because the pressurized source fluid fills more quickly than the fluid within the bladder 130 discharges. Other arrangements, for example, different sized piping and hosing may alternatively be utilized.

Figure 25:
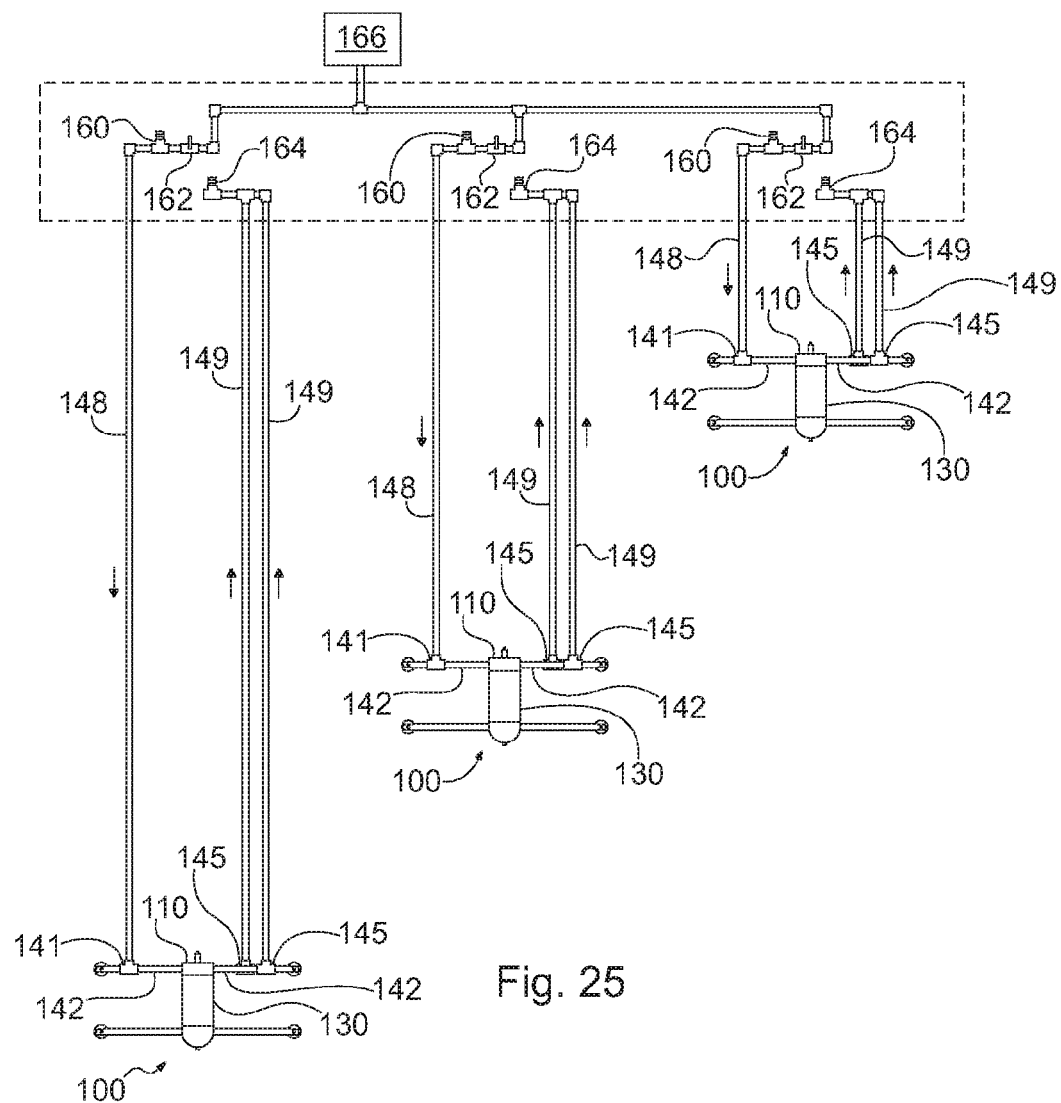
FIG. 25 is a schematic illustration of an exemplary fluid circuit used with the exemplary embodiment of the invention illustrated in FIG. 1.

Referring to FIG. 25, each fluid inlet 141 is connected to a fluid filling hose 148 which is in turn connected to an inlet valve 160. Each inlet valve 160 is connected to a compressed fluid source 166, for example a source of compressed air. A regulator 162 is preferably provided between the source 166 and the inlet valve 160 to regulate the fluid pressure. The regulators 162 may be a mechanical or electromechanical valve. The inlet valves 160 are preferably fast acting solenoid valves with a default closed position. Similarly, each fluid outlet 145 is connected to a fluid discharge hose 149 which is in turn connected to an outlet valve 164. The outlet valves 164 may vent to atmosphere or to a tank or the like depending on the pressure fluid utilized and/or whether or not the pressure fluid will be reused to feed the compressed fluid source. The outlet valves 164 are also preferably solenoid valves with a default closed position. In each instance, other mechanical or electromechanical valves may be utilized. The valves are preferably heavy duty to withstand repeated use.

As seen in FIG. 25, the fluid filling and discharge hoses 148, 149 must extend and retract for the full length of travel of the infton 100. In relatively short systems 10, the hoses 148, 149 may be free form to take a natural shape as the infton 100 travels between the top and bottom positions. However, as the length of travel of the inftons 100 increases, it is desirable to control the extension and retraction of the hoses 148, 149. One solution is to utilize a coiled hose for each of the hoses 148, 149. Alternatively, a retracting hose reel (not shown) may be utilized for each of the hoses 148, 149. Other hose control mechanisms may also be utilized. Alternatively, more fixed fluid supply and discharge systems may be utilized, for example, as described in the alternative embodiment described with reference to FIGS. 27 to 29.

Figure 26:
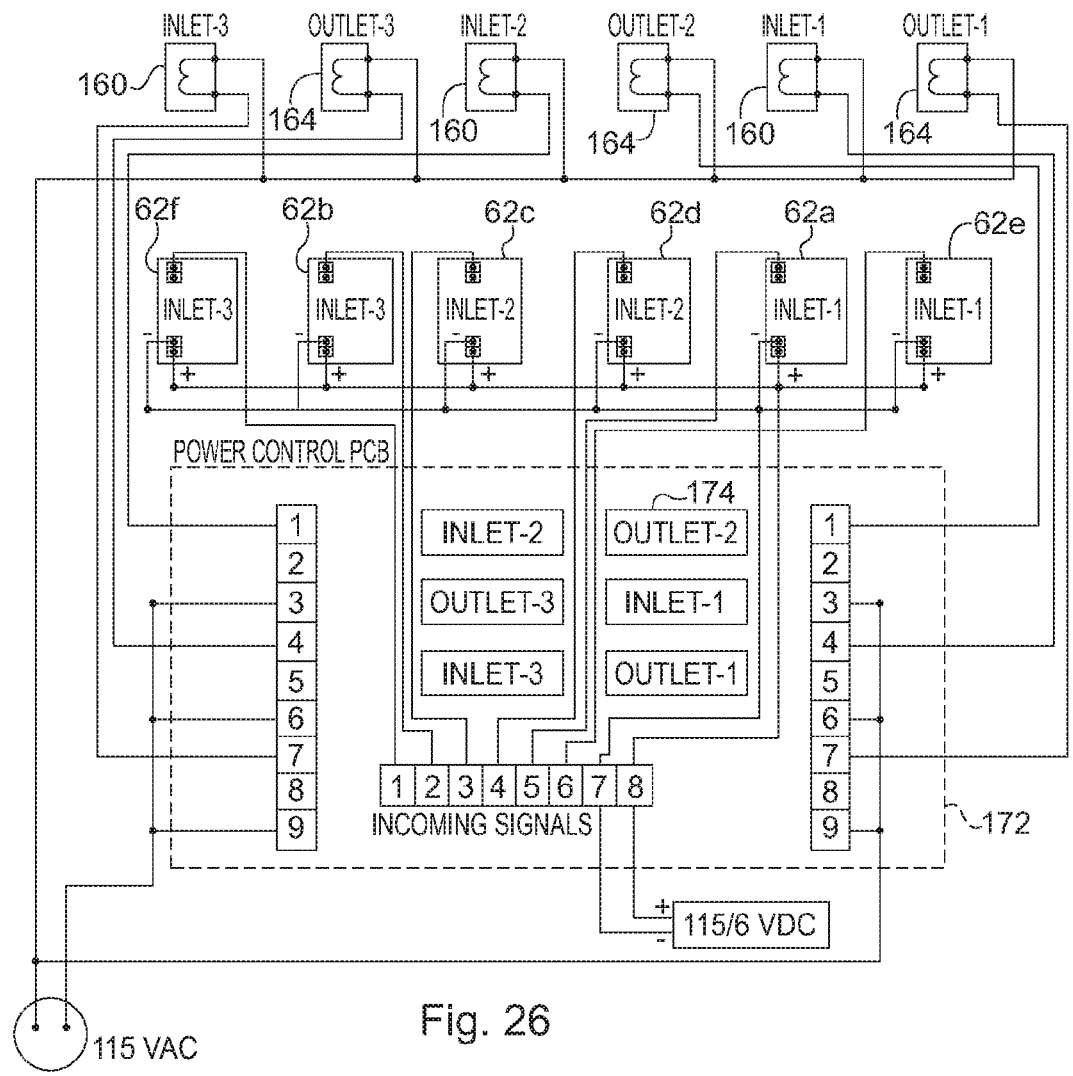
FIG. 26 is a schematic illustration of an exemplary electrical control circuit used with the exemplary embodiment of the invention illustrated in FIG. 1.

Referring to FIG. 26, a schematic diagram of an exemplary control circuit 170 is illustrated. In the illustrated embodiment, each inlet and outlet valve 160, 164 is a solenoid valve which is connected to the control board 172. The valves 160, 164 have a default closed condition, i.e the valve is closed to fluid flow when power is not supplied thereto. Similarly, each of the sensors 62a-62f is connected to the control board 172 and is configured to send a signal thereto when the control block 59 is positioned at the respective sensor 62a-62f. Upon receipt of a signal from a sensor 62a-62f, a respective relay 174 on the control board 170 is configured to send an electrical signal to the respective valve 160, 164 to open the valve for a given time based on the length of the control block 59. As explained above, the control board 170 is preferably configured to monitor the direction of travel of the control block 59, e.g. by monitoring the sequence of sensor triggering, and only activates the relay 174 for inlet valve 160 for infton 100B when the control block 59 is moving upward and only activates the relay 174 for outlet valve 164 for infton 100B when the control block 59 is moving downward. Other control circuitry may alternatively be utilized.

Figure 27:
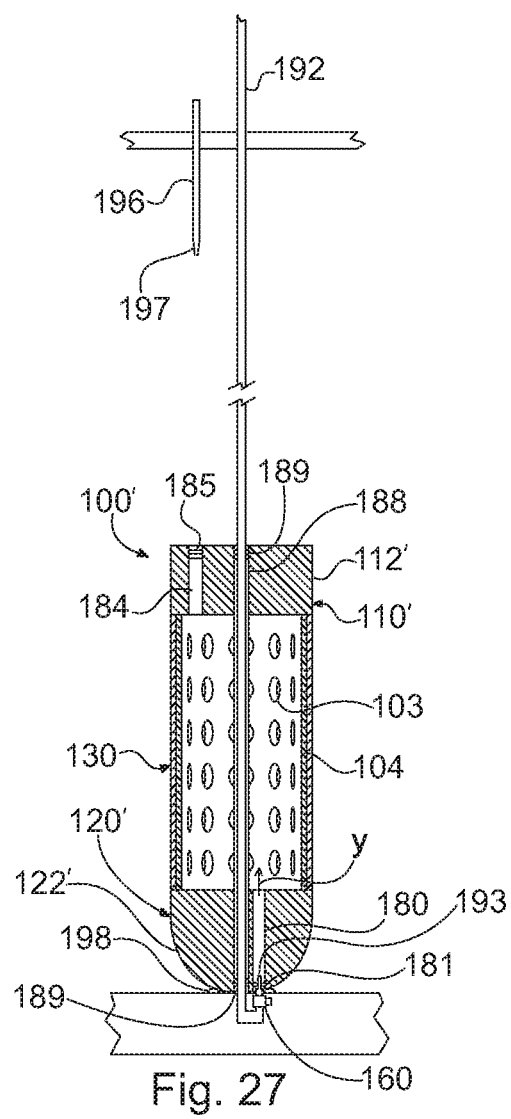
FIGS. 27-29 are cross-sectional elevation views showing an alternative infton in accordance with the invention.
Figure 28:
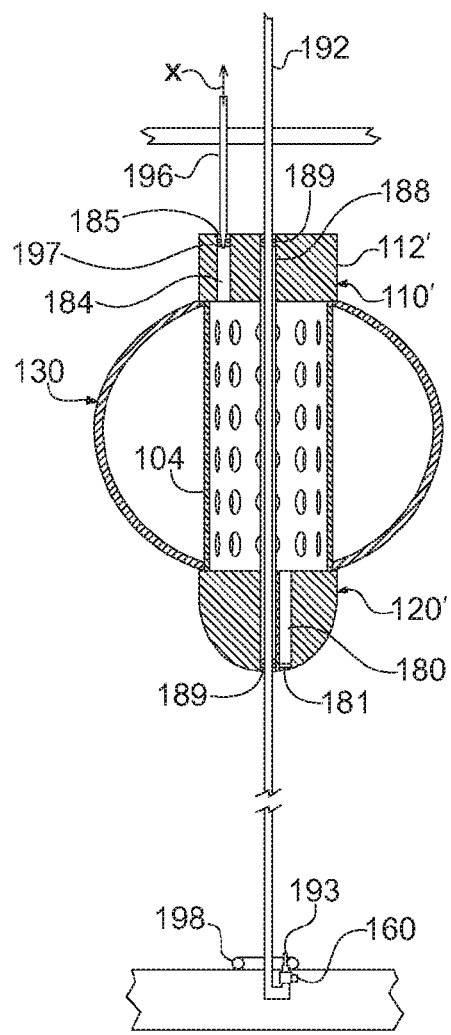
Figure 29:
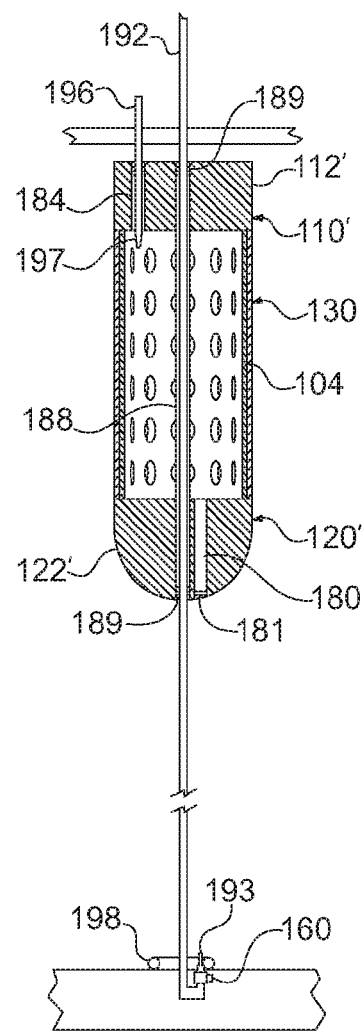

Referring to FIGS. 27-29, an infton 100' in accordance with an alternative exemplary embodiment of the invention will be described. The infton 100' is similar to the previous embodiment and includes a hollow cylindrical body 104, with through holes 103, extending between an upper member 110' and a lower member 120' and an inflatable bladder 130 about the body 104. The infton 100' differs from the previous embodiment in that it is guided via a rigid fluid supply tube 192 and does not connect to filling or discharge hoses. In the illustrated embodiment, the fluid supply tube 192 extends from a top plate 194 to a base 195. The tube 192 is preferably made from a rigid material and may be any desired length. For example, the tube 192 may extend from the ocean surface to the ocean floor or may extend multiple stories within a city building. To facilitate guided movement of the infton 100', a central cylinder 188 extends through the upper member 110', through the hollow cylinder body 104 and through the lower member 120'. The central cylinder 188 is preferably sealingly engaged with the upper and lower members 110', 120' such that buoyancy fluid does not enter the body 104 or bladder 130. The central cylinder 188 preferably includes internal bearings, bushings or the like 189 to minimize friction as the infton 100' moves relative to the supply tube 192. The infton 100' will be connected to a drive chain (not shown) and will move up and down in a manner similar to the previous embodiment. An elastic cushioning ring 198 or the like may be provided adjacent the lower end of each supply tube 192 to cushion the infton 100' as it reaches the lower limit of travel.

To inflate the infton 100', the lower member 120' includes an inlet port 180 extending therethrough in fluid communication with the hollow body 104. An inlet port seal 181 extends across the inlet port 180 and generally maintains the inlet port 180 fluidly sealed. A connection tip 193 extends from the supply tube 192 adjacent the base and is configured to penetrate the inlet port seal 181 when the infton 100' reaches the bottom position as shown in FIG. 27. The inlet valve 160 is preferably positioned close to the connection tip 193, such that upon receipt of an activation signal from the control system, the valve 160 may be opened and the infton bladder 130 quickly inflated with filling fluid as indicated by arrow Y. The connection tip 193 and the inlet port seal 181 are preferably configured to have a desired friction fit which will hold the infton 100' in the filling position until the infton 100' is filled with a desired amount of filling fluid, at which point the buoyancy force will overcome the friction force and the infton 100' will begin to move upward and disengage from the connection tip 193. Alternative mechanisms may alternatively be used to hold the infton 100' in the filling position for a desired period.

To discharge the filling fluid from the infton 100', the upper member 110' includes an outlet port 184 extending therethrough in fluid communication with the hollow body 104. An outlet port seal 185 extends across the outlet port 184 and generally maintains the outlet port 184 fluidly sealed. The outlet port seal 185 provides the outlet valve of the current embodiment. A hollow outlet tube 196 extends from the top plate 194 and includes a tapered tip 197 extending toward the infton 100'. The tapered tip 197 is configured to penetrate the outlet port seal 185 as the infton 100' approaches the top position as shown in FIG. 28. As such, the outlet tube 196 forms part of the control system to control discharge of the infton 100. The distance from the top position at which discharge begins can be controlled by controlling the length of the outlet tube 196. As soon as the tip 197 penetrates the seal 185, filling fluid will discharge through the tube 196 as indicated by arrow X. As the infton 100' continues to travel to the top position, the tube 196 simply enters further into the infton 100' through the outlet port 184 as shown in FIG. 29. Once the filling fluid is discharged, the mass of the infton 100' will overcome the friction fit between the tube 196 and the seal 185 and the infton 100' will begin its downward movement. In all other aspects, the system utilizing infton 100' operates in a manner as described above.

In an alternative embodiment, for example, a large ocean system, each infton may be sized to include an internal compressor configured to produce the filling fluid as necessary. Power and inlet air may be provided to the compressor via the rigid tube 192.

The shaft driving system 10 of the present invention provides many advantages over current systems. As explained above, the system 10 simply requires a pressurized filling fluid to raise the inftons 100. The driving force is provided by gravity and there is no need for additional power, i.e. no need to utilize gas or other fuel to produce the driving force. The system 10 therefore has minimal negative pollution, toxic or thermal effects on the environment. The system 10 can be quickly and easily installed and requires little maintenance. Additionally, the system 10 may be easily expanded with modular components. Furthermore, because the system 10 is ecological and relatively quiet, it can be operated in closed proximity to the end use, e.g. within a city building, which reduces the transmission distance and associated transmission losses. Other advantages will be readily recognized by those skilled in the art.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for generating rotational movement, the method comprising:
    supporting an output shaft for rotational movement, the output shaft including at least two one-way clutch mechanisms attached thereto, each one-way clutch mechanism configured to rotationally drive the output shaft in a first direction and to freely rotate relative to the output shaft in a second, opposite direction;
    positioning an infton assembly in association with each one-way clutch mechanism such that each infton assembly is surrounded by a buoyancy fluid, each infton assembly including:
        a weighted member;
        an inflatable bladder associated with the weighted member and having a fluid inlet into the inflatable bladder and a fluid exit from the inflatable bladder;
        at least one inlet valve positioned along the fluid inlet;
        at least one outlet valve positioned along the fluid exit; and
        a chain associated with the weighted member and extending over and drivingly engaging the respective one-way clutch mechanism; and
    controlling the inlet and outlet valves such that each inlet valve is opened while the respective outlet valve is closed to facilitate flow of a filling fluid having a density less than that of the buoyancy fluid into the respective inflatable bladder as the respective weighted member reaches a lower limit of travel and each outlet valve is opened while the respective inlet valve is closed to facilitate exhausting of the filling fluid within the respective inflatable bladder as the respective weighted member reaches an upper limit of travel,
    wherein movement of each weighted member is guided by one or more guides which include radially outwardly extending guide rods, each guide rod having a friction reducing structure thereon configured to engage an inside surface of a container in which the weighted member is positioned and wherein one or more of the guide rods defines a portion of a fluid path between an internal chamber of the weighted member and one of the inlet or outlet valves.

2. The method of claim 1, wherein the number of one-way clutch mechanisms and infton assemblies within a given set is equal to N, which is an integer greater than or equal to 2, and the step of controlling the inlet and outlet valves includes synchronizing the distance D the weighted member of each infton assembly of the given set is from the upper travel limit at a given moment to follow the formula $$\sum D_{1\ldots N} \leq \frac{N \cdot T}{2}$$

wherein T equals the distance of travel between the lower limit of travel and the upper limit of travel.

3. The method of claim 1, wherein the filling fluid is compressed air and the buoyancy fluid is water.

4. The method of claim 1, wherein the buoyancy fluid is contained within one or more containers.

5. The method of claim 1, wherein the buoyancy fluid is a natural fluid body.

6. The method of claim 1, wherein the control system and valves are configured such that a time of upward travel of the weighted member from the lower limit of travel to the upper limit of travel is equal to a time of downward travel of the weighted member from the upper limit of travel to the lower limit of travel.

7. The method of claim 1, wherein the control system and valves are configured such that a time of upward travel of the weighted member from the lower limit of travel to the upper limit of travel is less than a time of downward travel of the weighted member from the upper limit of travel to the lower limit of travel.

8. The method of claim 1, wherein the inlet and outlet valves are solenoid valves having a default closed position.

9. The method of claim 1, wherein the inlet valves are solenoid valves having a default closed position and the outlet valves are defined by seals within the fluid outlets configured to engage hollow outlet tubes which facilitate discharge of filling fluid from the infton assemblies.

10. The method of claim 1, wherein a fluid hose extends between each inlet valve and the filling fluid source.

11. The method of claim 10, wherein each hose is a flexible hose, a spiral hose or retracting hose.

12. The method of claim 1, wherein the control system includes one or more sensors configured to sense the position of at least one of the weighted members and to coordinate the position of the remaining weighted members based on the sensed position.

13. The method of claim 12, wherein the control system includes a plurality of infra red sensors and a control chain which moves in conjunction with one of the weighted members includes a control block configured to pass the infra red sensors to indicate the position of the weighted member.

14. The method of claim 13, wherein the control chain is drivenly mounted on a control shaft which is driven by the drive chain engaging a control gear mounted on the control shaft.

15. The method of claim 14, wherein the control gear provides a gear ratio such that the travel of the control chain is reduced relative to the travel of the drive chain by the gear ratio.

16. The method of claim 12, wherein the one or more sensors are selected from the group consisting of a rotary encoder, a linear or rotary variable differential transformer, a string potentiometer, a linear encoder and photodiode arrays.

17. The method of claim 1, wherein the guides include radially inwardly extending bearings or bushings configured to move along a rigid tube.

* * * * *